United States Patent [19]
Van den Bossche et al.

[11] Patent Number: 5,527,218
[45] Date of Patent: Jun. 18, 1996

[54] REVERSING MEANS FOR AN AGRICULTURAL HARVESTING MACHINE

[75] Inventors: Bart Van den Bossche, Zedelgem; Jan R. Van Steelant, Loppem; Adrianus Naaktgeboren, Varsenare; Alfrons W. Dedeyne, Roeselare; Guy H. J. Osselaere, Loppem; Bert J. F. Paquet, Sint-Andries, all of Belgium

[73] Assignee: New Holland North America, Inc., New Holland, Pa.

[21] Appl. No.: 435,259

[22] Filed: May 5, 1995

[30] Foreign Application Priority Data

May 7, 1994 [GB] United Kingdom ................... 9409109

[51] Int. Cl.⁶ .................................................. A01D 69/06
[52] U.S. Cl. ............................ 460/20; 460/116; 460/119; 56/11.2
[58] Field of Search ................................ 460/16, 20, 116, 460/119; 56/11.2, 11.3

[56] References Cited

U.S. PATENT DOCUMENTS

| | | | |
|---|---|---|---|
| 4,430,847 | 2/1984 | Tourdot et al. | 56/11.2 X |
| 4,467,590 | 8/1984 | Musser et al. | 56/11.2 |
| 4,512,139 | 4/1985 | Musser et al. | 56/11.2 |
| 4,663,919 | 5/1987 | Stroh et al. | 56/11.2 |
| 4,843,767 | 7/1989 | Johnson | 51/247 |

Primary Examiner—Terry Lee Melius
Attorney, Agent, or Firm—Frank A. Seemar; Larry W. Miller

[57] ABSTRACT

An agricultural harvesting machine, such as a forage harvester, comprises a plurality of crop processing means (20, 21, 26, 27, 36, 38, 49), which are driven in a first sense by an engine (70) through a main clutch (124) and a first drive line portion (111, 112, 39, 87, 89) or a second drive line portion (73, 75, 77, 80, 81, 83). A motor means (110), coupled to the first drive line portion and operable to drive one of the crop processing means, such as a cutterhead (36), in a second sense, opposite to the first sense, is permanently coupled to said first drive line portion, so that during normal harvesting it can provide driving power to auxiliary devices. The second drive line portion is linked to the first drive line portion by means of a belt transmission (95, 99, 100), which is engaged by a hydraulic cylinder (106) when the main clutch (124) is engaged. The first drive line comprises an overrun clutch (87) which is disengaged when the rotation of the cutterhead (36) is reversed by the motor means (110).

15 Claims, 7 Drawing Sheets

REVERSING MEANS FOR AN AGRICULTURAL HARVESTING MACHINE

FIELD OF THE INVENTION

The present invention relates generally to agricultural harvesting machines, which collect crop material from the field and process the same, such as forage or combine harvesters, comprising a plurality of crop processing means for conveying or treating the crop material during normal harvesting operation. More particularly, the invention relates to means for driving one or more of these devices in a sense, which is opposite to the normal operating sense during harvesting operation.

BACKGROUND OF THE INVENTION

Generally, agricultural harvesting machines, such as forage or combine harvesters, are equipped with crop collecting devices, such as corn or grain headers or pick-up units, for collecting crop material from the field and deliver it to further crop processing means of the harvesting machine. In a forage harvester, for example, these devices usually comprise a set of feed rolls, a rotating cutterhead cooperating with a fixed shear bar, operable to comminute the crop material fed thereto by the feed rolls, and a blower, which receives the comminuted material and propels it out of the harvester through a spout, directing the material flow into a container moved behind or aside the forage harvester. The crop processing means of a combine harvester customarily comprise a straw conveyor, which feeds the crop material to threshing means, including one or more threshing drums, further separation means, such as straw walkers, and cleaning means, including sieves and a ventilator, operable to remove impurities such as chaff and pieces of straw from the grain kernels.

During normal harvesting operation, these conveying and harvesting devices demand a large amount of power from the harvester's engine and are most advantageously linked thereto by mechanical drivelines. In some case however, it may be required to reverse one or more of these devices. This usually is done by breaking the drive line from the engine and branching a reversing motor to the one or more devices. When the harvester returns to normal harvesting operation, the reversing motor is inactivated and has no further functions.

A hydraulic reversing system for the cutterhead of a forage harvester is illustrated in Eurpean Patent Application No. 0.335.332. During the knife sharpening operation, the cutterhead rotation is reversed by means of a hydraulic motor in order to provide the knife edges with an optimum cutting profile. A clutch mechanism has to be energized before the driving power from the motor is transferred upon the cutterhead. During normal harvesting operation, the hydraulic motor is shut off and no more use is made thereof.

A hydraulic reversing system for the header and the straw elevator of a combine harvester is illustrated in European Patent Application No. 0.180.027. When the auger of a grain header or the straw elevator gets blocked by an excessive amount of crop material, the operator can reverse the header and the straw elevator in order to remove the obstruction from the harvester. The drive line from the engine to the straw elevator is broken and a hydraulic motor is branched to the drive line of the header and the elevator by means of a hydraulically operated clutch mechanism. When the hydraulic motor is deactivated in order to return to normal working conditions and the oil pressure has dropped consequently in the clutch circuit, the clutch mechanism disengages and no more use is made of the reversing motor.

SUMMARY OF THE INVENTION

It is an object of the present invention to simplify the construction and the operation of the reversing mechanism by eliminating the clutch mechanism between the reversing motor and the reversed device. It is a further object thereof to use the reversing motor for providing driving power to other devices during normal harvesting operation.

Accordingly, to the present invention contemplates an agricultural harvesting machine having a power plant for, during normal harvesting operation, driving via power transmission means a plurality of crop processing means in a first sense, and motor means, drivingly coupled to at least one of the crop processing means and operable to drive the at least one crop processing means in a second sense, opposite to the first sense. More particularly, the agricultural harvesting machine is characterized in that, during normal harvesting operation, the motor means remain coupled to the at least one crop processing means and are driven via the power transmission means in the first sense.

The motor means may be in the form of a hydraulic gear motor, which acts as a hydraulic gear pump when rotated in the first sense by the transmission means. The resulting oil flow may be used for driving auxiliary devices of the harvesting machine. In order to reduce the motor load during reversing, an overrun clutch is installed between the reversed crop processing means and the other crop processing means which are normally driven in the first sense by the reversed crop processing means.

After normal operation of the harvesting machine, it is advantageous to foster the deceleration of the still rotating crop processing means before reversing its driving sense. This is obtained by maintaining engagement of a clutch between this crop processing means and other crop processing means of the machine, until its speed falls below a predetermined threshold value. For ease of operation, the command of such a clutch may be linked to the command of a main clutch between the engine of the harvesting machine and the drive line of the crop processing means.

This invention can be used in a forage harvester for reversing the cutterhead during knife sharpening or in a combine harvester for reversing the header auger and straw elevator in order to clear the same when they are jammed by an excessive amount of crop material.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

The preferred embodiment of the present invention is illustrated in the FIGS. 1 to 6.

Figure 1:
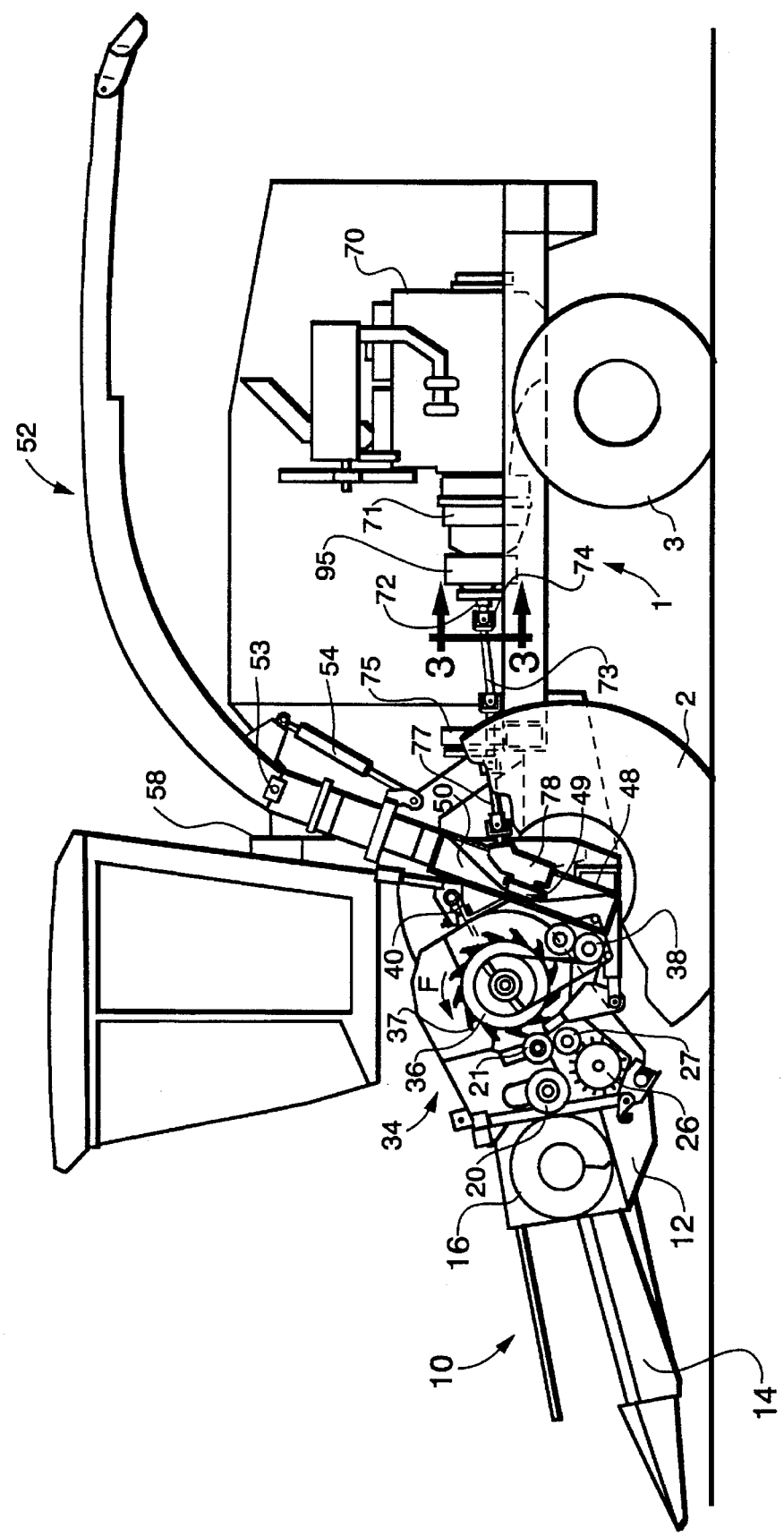
FIG. 1 is a schematic, side elevational view of a forage harvester, comprising an engine, a power-take-off (PTO) assembly mounted thereto, a front unit, a blower module and a spout.

In FIG. 1, there is shown a forage harvester having a main frame 1 on which there are mounted ground engaging traction wheels 2 and steering wheels 3. The forage harvester is shown equipped with a crop collecting apparatus, in the form of a row crop attachment 10, suitable for the harvesting of maize, but which can be replaced with a conventional windrow pick-up device or a conventional cutter bar attachment, depending on the type of crop to be harvested. Customarily, the row crop attachment 10 comprises an attachment frame 12, which supports a plurality of row crop units 14, operable to harvest maize stalks from the field and to convey the same rearwardly to an auger 16, which in turn delivers the crop material to the bite of feeder means installed in a front unit of the forage harvester.

Said feeder means comprise lower feeder means, including a forward lower feedroll 26, and a smooth, rear lower feedroll 27, and upper feeder means, including an upper forward feedroll 20 and an upper rear feedroll 21. Said upper and lower feeder means rotate to convey the crop material inbetween to a cutterhead 36, which is mounted within a cutterhead frame 34 and comprises a plurality of knives 37, generating a cylindrical peripheral shape or profile, when the cutterhead 36 is rotated.

During normal harvesting operation, when the cutterhead 36 is rotated in its normal operation sense, as indicated by arrow F in FIG. 1, the knives 37 cooperate with a fixed shearbar to cut the crop material to length and to project it to a pair of counter-rotating crop processor rolls 38, which crack the kernels which are left in the chopped material and deliver the whole to a blower rotor 49 which is installed within a blower housing 48. The blower rotor 49 comprises a plurality of paddles 50, which throw the material upwardly through the blower outlet into a discharge spout 52, which can be positioned by an operator to direct the cut crop material as required, normally into a wagon which is moving alongside or behind the forage harvester. The spout 52 is pivoted vertically about a pair of pins 53 by a hydraulic cylinder 54, which is mounted between the top of the blower housing 48 and the underside of the spout 52.

Figure 2:
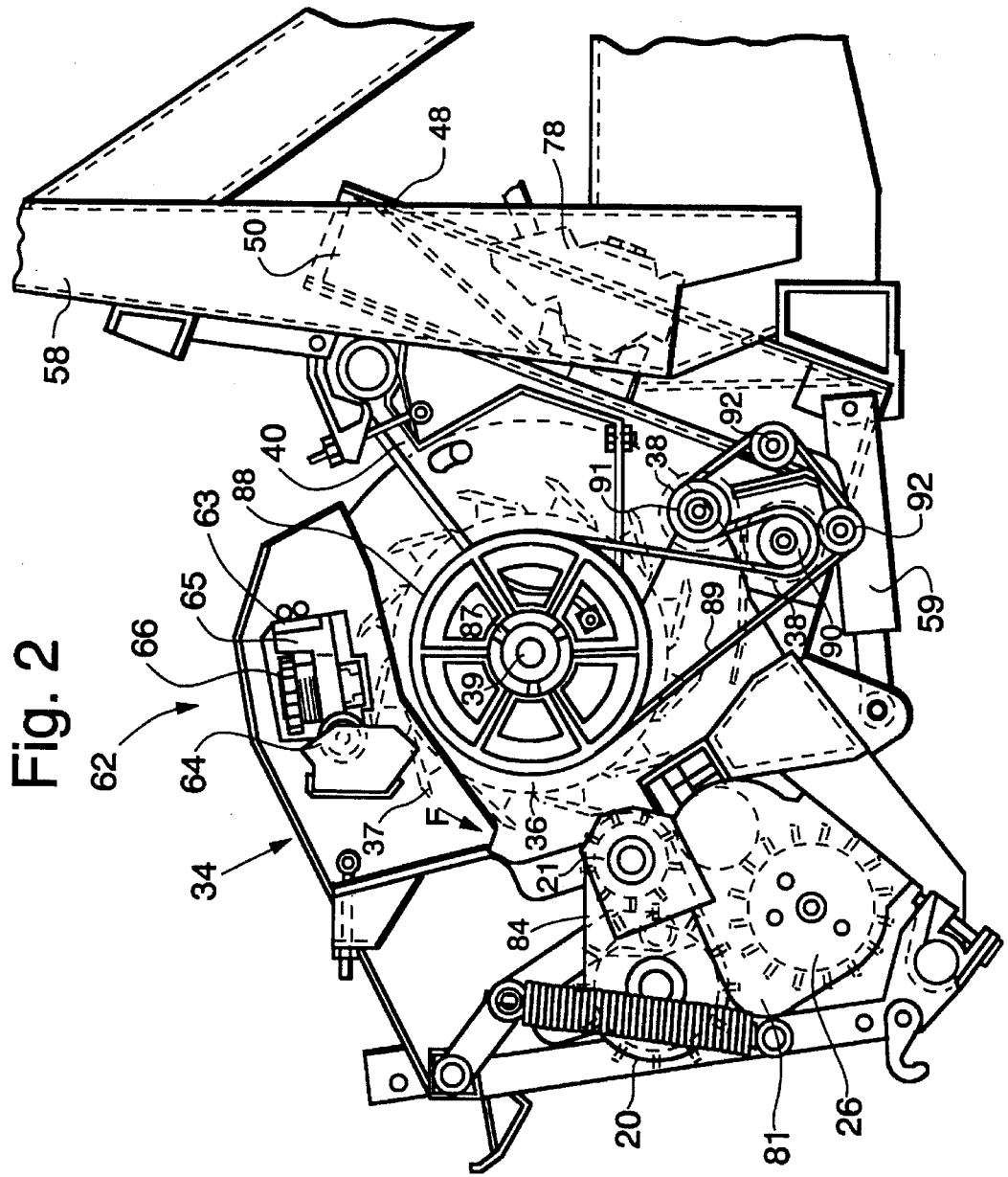
FIG. 2 is an enlarged side view of the front unit and the blower module of FIG. 1.

As shown in FIG. 2, the cutterhead 36 is rotated about an axle 39 journalled on a cutterhead support 40 which is attached to vertical beams 58 of the main frame 1. The cutterhead frame 34 is mounted for pivotal movement about the same axle 39. Its position relative to the main frame 1 is controlled by a pair of hydraulic lift cylinders 59, which are mounted between a lower portion of the cutterhead frame 34 and the main frame 1. The elongation, respectively shortening thereof will pivot the front section of the cutterhead frame 34 upwardly, respectively downwardly so as to raise, respectively lower the attachment 10 coupled thereto.

Above the cutterhead 36 there is mounted a knife sharpening device 62, comprising a guide rail 63 and a guide shaft 64, which both extend between the side plates of the cutterhead frame 34 and which slidingly carry a stone carrier 65, holding a sharpening stone 66. During sharpening operation the stone carrier 65 is moved to and fro between the side plates of the frame 34, while the stone 66 is gradually lowered towards the rotating cutterhead 36. In order to obtain optimum cutting edges for the knives 37, the cutterhead 36 is rotated in a sense opposite to the normal operation sense, indicated by arrow F.

As shown in FIG. 1, the forage harvester is driven by a power plant or engine 70, which is drivingly connected to a power-take-off (PTO) gearbox 71. The output shaft 72 of the PTO gearbox 70 is linked to a universal joint 74 of a drive shaft 73, whereof another universal joint 74 is linked to a transmission 75. An output shaft of the transmission 75 is connected to a blower drive shaft 77, which drives a blower gearbox 78, which supports and rotates the blower rotor 49.

Another output shaft of the transmission 75 is connected to a feedroll drive shaft 80, which drives a lower feedroll transmission 81 on the left hand side of the front unit, shown in FIG. 2. This transmission 81 is connected directly to the lower feedrolls 26, 27 and through a drive shaft 83 to the rear upper feedroll 21. On the right hand side of the front unit, an upper feedroll transmission 84 drivingly interconnects the upper feedrolls 21, 20.

The cutterhead axle 39 carries at its left hand end the inner ring of an overrun clutch 87. The outer ring thereof is mounted to a grooved sheave 88. When the cutterhead 37 is rotated in the sense indicated by arrow F in order to comminute incoming crop material, the clutch 87 engages and the sheave 88 entrains a transmission belt 89. Otherwise, when the rotation of the cutterhead 37 is reversed, as during sharpening operation, the clutch 87 disengages and the sheave 88 stands still.

The transmission belt 89 drives a smooth sheave 90 connected to the lower crop processor roll 38 and a grooved sheave 91 connected to the upper crop processor roll 38. A pair of spring biassed idler sheaves 92 tensions the belt 89 in order to maintain engagement with the cutterhead sheave 88 and the roll sheaves 90, 91.

Figure 3:
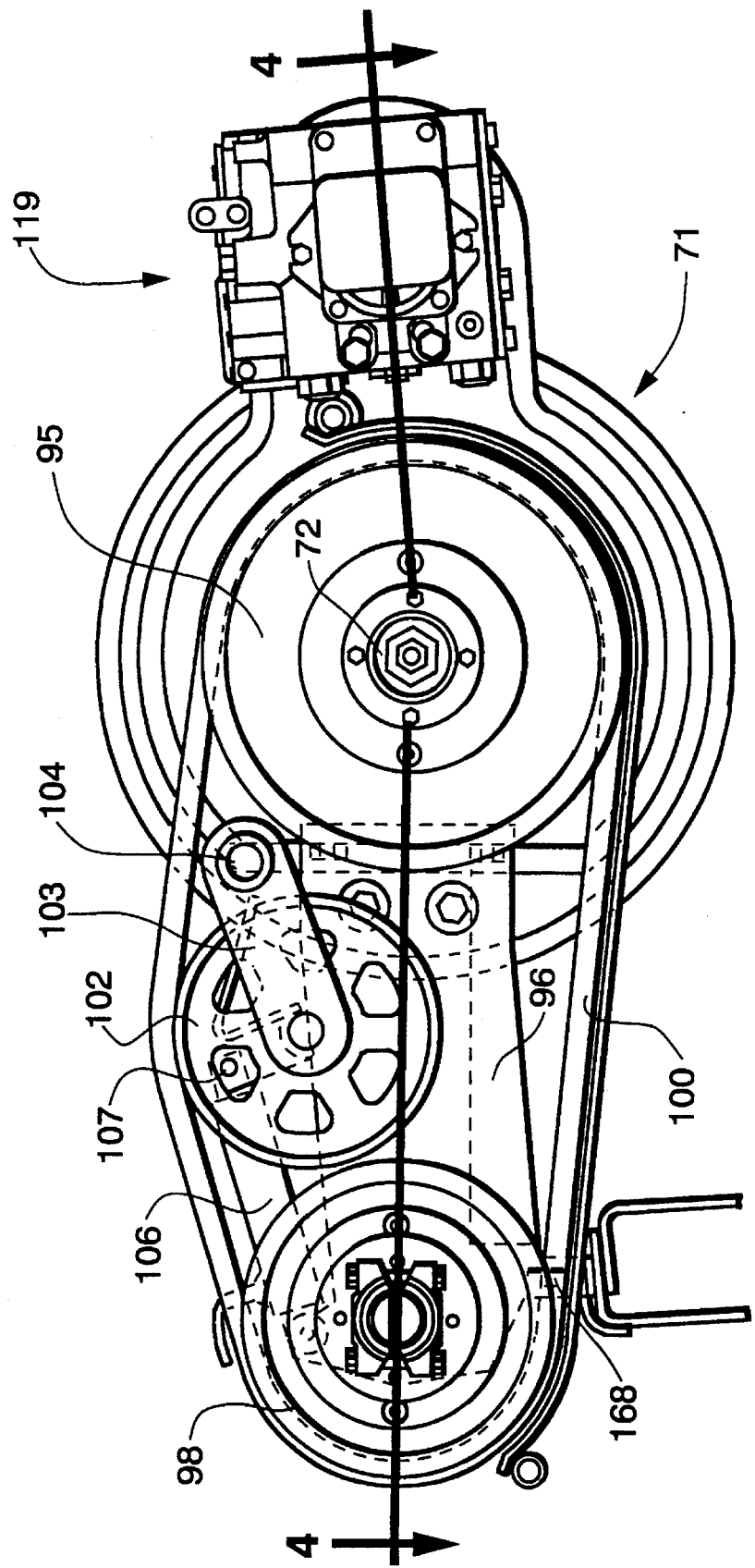
FIG. 3 is an enlarged front view of the PTO assembly, taken along lines III—III of FIG. 1.
Figure 4:
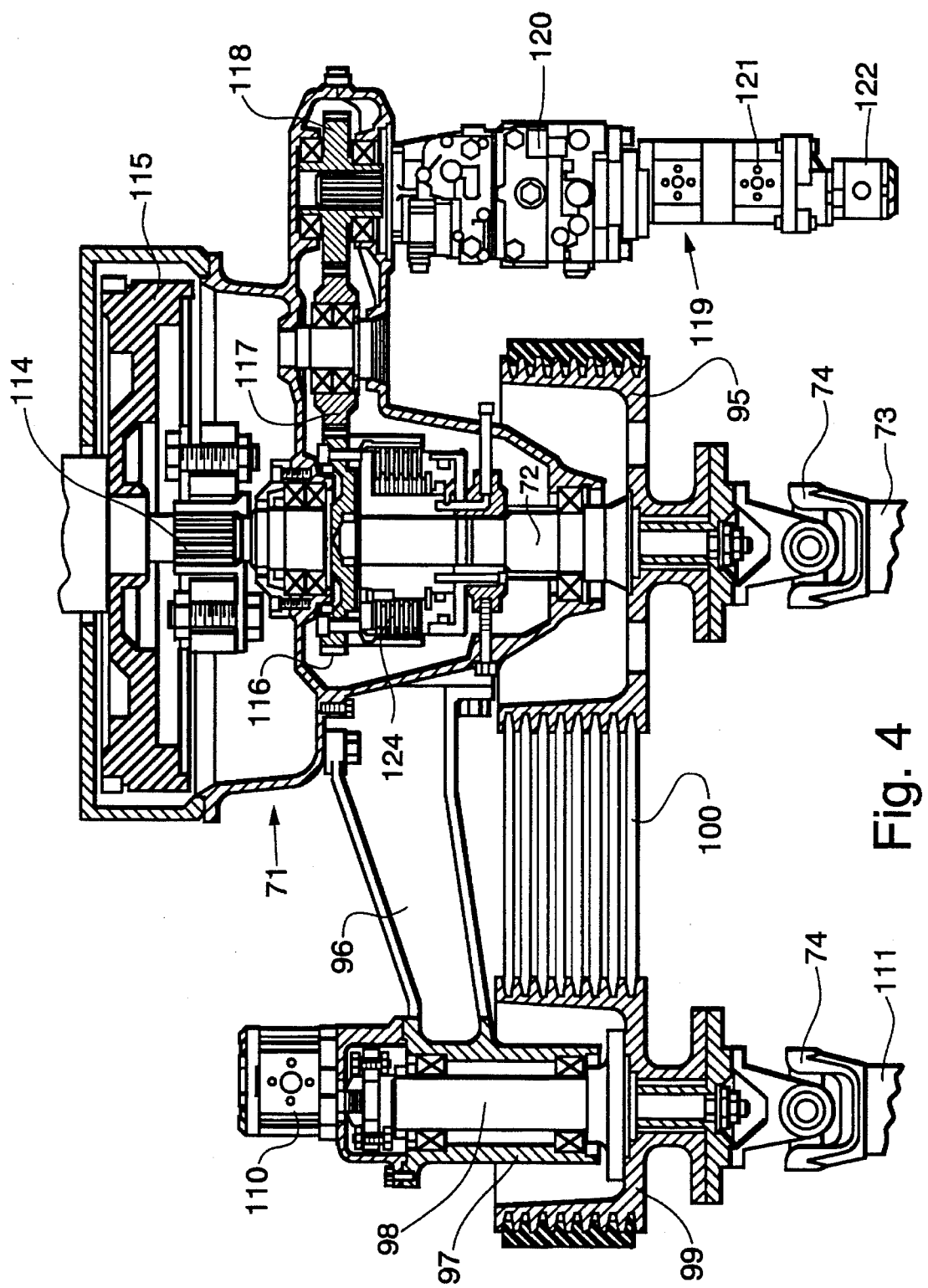
FIG. 4 is a sectional view of the PTO assembly, taken along lines IV—IV of FIG. 3.

As depicted in FIGS. 3 and 4, the output shaft 72 of the PTO gearbox 71 carries a grooved PTO sheave 95, to which the universal joint 74 of the drive shaft 73 is mounted. An arm 96 of a bearing housing 97 is attached to the right hand side of the PTO gearbox 71. In the bearing housing 97 a shaft 98 is rotated, which carries a sheave 99 at its front end. A transmission belt 100, running over both sheaves 95, 99, can be tensioned with an inner idler roll 102, which is rotated in an idler arm assembly 103, which is pivoted about a journal 104, extending from the PTO gearbox 71. The idler roll 102 is loaded by a hydraulic cylinder 106, which is installed between the bearing housing 97 and a protrusion 107 of the idler arm assembly 103.

A hydraulic gear motor 110 is mounted onto the rear of the bearing housing 97 and its output shaft is coupled to the rear end of the shaft 98. A cutterhead drive shaft 111 is connected with a universal joint 74 to the front of the sheave 99. The other end of the drive shaft 111 is connected by another universal joint 74 to the input shaft of an angle transmission 112, which drives the cutterhead axle 39.

The PTO gearbox 71, as best shown in FIG. 4, comprises a PTO input shaft 114, which is coupled at its rear end to the flywheel 115 of the engine 70 and at its front end to a first spur gear 116, meshing with a second spur gear 117. The latter gear 117 drives a third spur gear 118, which receives the input shaft of a hydraulic pump assembly 119, comprising a squash plate pump 120, which provides driving power to the traction wheels 2, and gear pumps 121, 122. The PTO input shaft 114 is linked to the PTO output shaft 72 by means of a hydraulically actuated clutch 124. When fluid pressure is applied thereto, the clutch 124 becomes engaged and the output shaft 72 is rotated unitarily with the input shaft 114.

Figure 5:
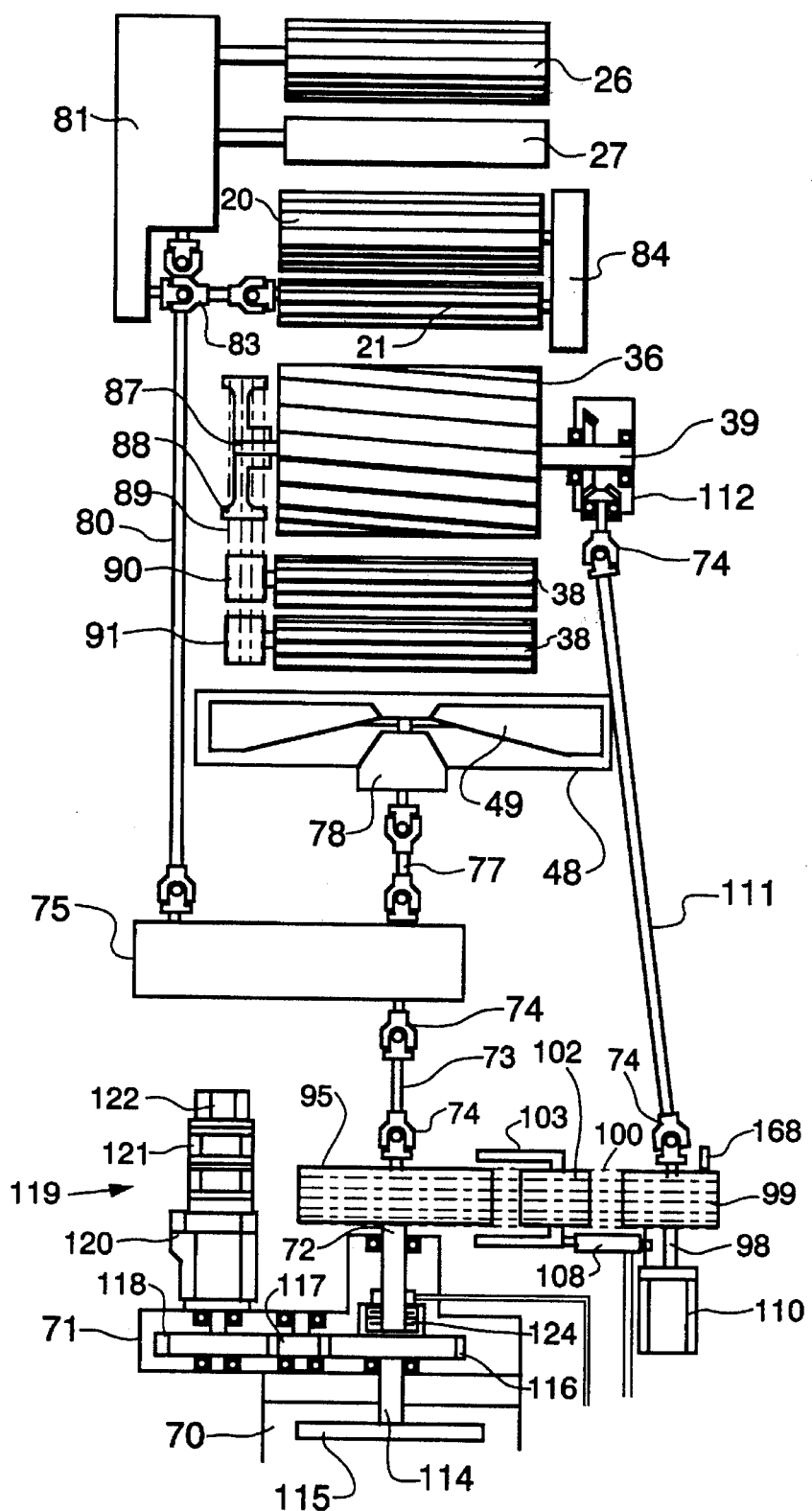
FIG. 5 is a schematic view of the drive lines and driven crop processing means of the forage harvester of FIG. 1.

The drive lines are illustrated schematically in FIG. 5, together with their relationship to the crop processing means of the forage harvester. A first drive line portion comprises the cutterhead drive shaft 111, the angle transmission 112, the cutterhead axle 39, the overrun clutch 87 and the belt transmission, comprising the sheave 88, the crop processor sheaves 90, 91 and the transmission belt 89. A second drive line portion comprises the drive shaft 73, the transmission 75, the blower drive shaft 77 and gearbox 78, the drive shaft 80, the lower feedroll transmission 81, the drive shaft 83 and the upper feedroll transmission 84. Other devices, such as the row crop attachment 10 may equally be driven by one or other of the drive line portions.

The first drive line portion is connected to the second by means of the main belt transmission, comprising the sheaves 95, 99 and the belt 100. It can be disconnected therefrom by releasing the pressure from the hydraulic cylinder 106, which then retracts under action of the belt 100 and the idler roll 102. The belt 100 is set loose and disengages from the grooves of the sheaves 95, 99.

Both drivelines can be connected to and disconnected from the engine 70 by means of the hydraulic clutch 124. Meanwhile the hydraulic pump assembly 119 remains constantly driven by the engine 70 through the gears 116, 117 and 118.

Figure 6:
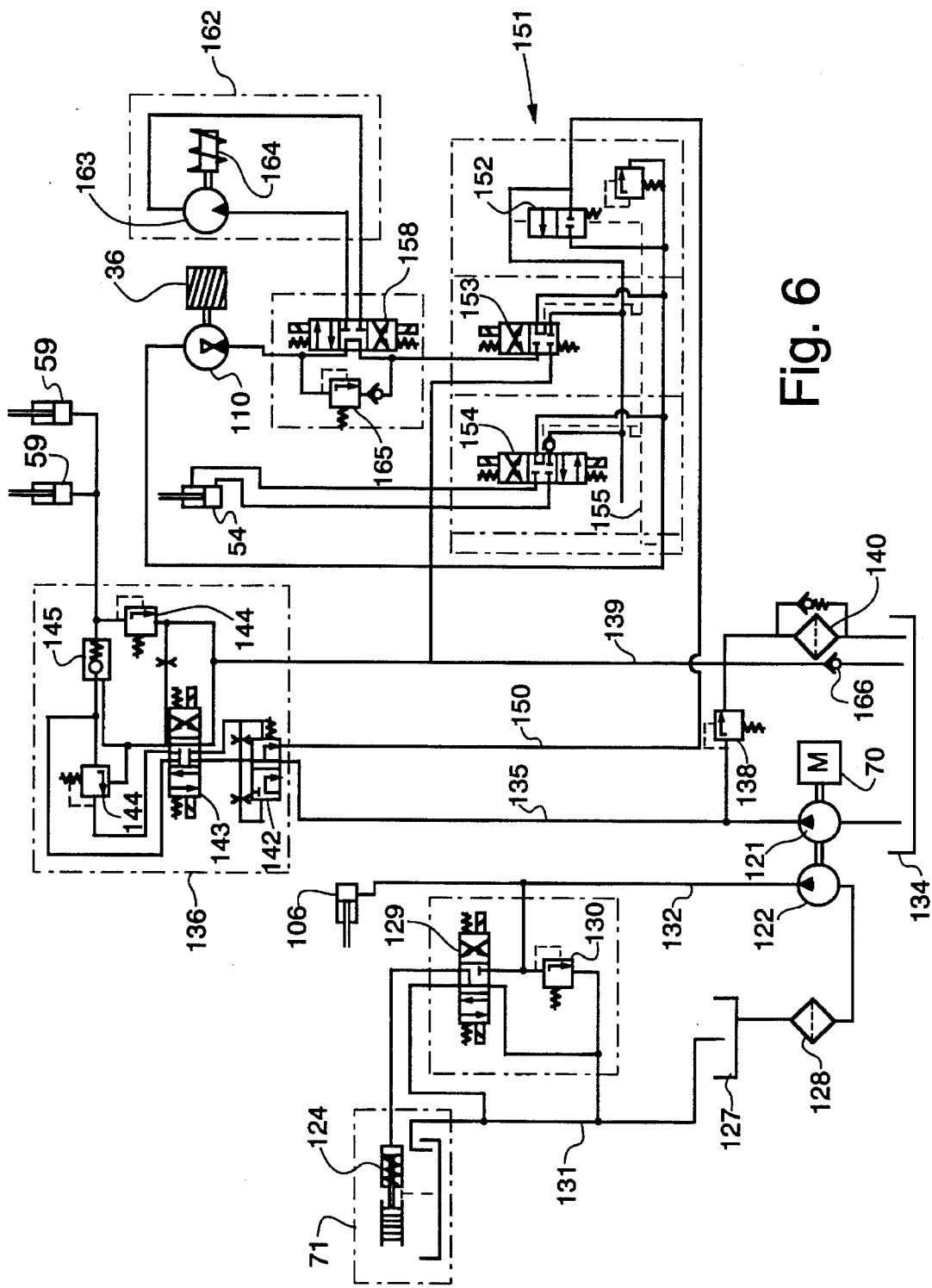
FIG. 6 is a schematic of a portion of the hydraulic circuitry of a forage harvester according to FIG. 1.

A portion of the hydraulic control system is schematically represented in FIG. 6. When the engine 70 is running, the hydraulic gear pump 122 draws oil from a shunt tank 127 through an oil filter 128 and feeds it via a hydraulic feed line 132 to a solenoid operated control valve 129 and the hydraulic cylinder 106 of the main belt transmission. One output port of the valve 129 is connected to the hydraulic clutch 124, the other is connected to the return line 131, which ends in the shunt tank 127.

Immediately after the start of the engine 70, the valve 129 is still in its rest position, as shown in FIG. 6, and the feed line 132 is pressurized, as to extend the cylinder 106. The pressure level is controlled by a relief valve 130, which is equally linked to the feed line 132. The position of the valve 129 is controlled by an electrical circuit (not shown), comprising a programmable control unit, such as a microprocessor.

In order to engage the hydraulic clutch 124, the valve 129 is shifted to the right so that the pressure from feed line 132 is applied to the piston of the clutch 124. Only a small amount of leakage oil drips from the clutch into the PTO gearbox 71, which is also connected to the return line 131. The feed line 132 and the cylinder 106 remain pressurized. Consequently, both drive line portions are driven by the engine 70.

The hydraulic oil from the clutch 124 also serves as a lubricant to the bearings and the gears 116, 117, 118 in the gearbox 71. Thereby most of the oil is mixed with air and divided over the inner surface of the gearbox 71, which makes the latter unsuitable for use as a tank, from which the oil may be drawn by the gear pump 122. Therefore the surplus oil is delivered to the shunt tank 127, where it can settle before it is fed to the gear pump 122.

When the valve 129 is shifted to the left, the feed line 132 is connected to the return line 131, so that the pressure in the feed line 132 drops and the hydraulic clutch 124 disengages. Simultaneously the hydraulic cylinder 106 retracts under the action of the transmission belt 100, so that the first drive line portion, comprising the cutterhead drive shaft 111, is disconnected from the second drive line portion. When the control valve 129 is shifted back to the right in order to reengage the clutch 124, it passes through the middle position, in which only the cylinder 106 is pressurized. The idler roll 102 thus is loaded before the clutch 124 starts to rotate the PTO sheave 95. This operating sequence prevents unnecessary slippage of the belt 100, so that its lifetime will be extended.

The engine 70 is equally driving the gear pump 121, which draws hydraulic oil from an oil tank 134 and feeds it via another feed line 135 to a valve assembly 136, which controls the oil flow to the hydraulic lift cylinders 59 between the cutterhead frame 34 and the main frame 1. The feed line 135 is protected against overpressure by a pressure relief valve 138, which is connected to a return line 139, which feeds the return oil through a filter 140 to the oil tank 134.

The valve assembly 136 comprises a slave valve 142, which is hydraulically controlled by a solenoid operated control valve 143, and two pressure relief valves 144. The electrical circuit, which controls the clutch valve 129, equally controls the valve 143. When the latter is in its rest position, as shown in FIG. 6, oil pressure will be built up at the left side of the slave valve 142, which consequentially shifts to the right and connects the feed line 135 to a feed line 150 of a stack valve 151. When a solenoid of the valve 143 is energized to shift the latter to the right, equal oil pressure will build up on both sides of the slave valve 142, which then will be shifted back by a spring to the position shown in FIG. 6. Oil from the feed line 135 is supplied through the valves 142, 143 and a non-return valve 145 to the hydraulic lift cylinders 59, which extend to lift the attachment 10. When the other solenoid of the control valve 143 is energized to shift the same to the left, oil pressure is provided to the non-return valve 145, which opens to let oil flow from the cylinders 59 to the valve 143 and therefrom to the return line 139, whereby the cylinders 59 retract and the attachment 10 is lowered.

The stack valve 151 controls a plurality of hydraulic devices, whereof only a few are depicted. The feed line 150 is received at a distributor valve 152, to which two solenoid operated control valves 153, 154 are mounted. The latter are electrically connected to the electrical circuit mentioned above. When said valves 153, 154 are in their rest position, as shown in FIG. 6, the oil pressure in the feed line 150 pushes the valve 152 downwardly, as to connect the feed line 150 to the return line 139. When any of the solenoids of the valves 153, 154 is energized to shift the latter up or down, oil pressure will be provided to a control line 155 and the distributor valve 152 is shifted upwardly as to divert the oil flow from the return line 139 to the actuated valve.

The solenoid operated valve 154 is linked to the hydraulic cylinder 54 of the spout 52. When the valve 154 is shifted upwardly, the cylinder 54 will extend as to raise the spout 52. When it is shifted down, the cylinder 54 will retract as to lower the spout 52.

The solenoid operated valve 153 is linked via a solenoid operated valve 158 to the hydraulic gear motor 110, which is drivingly linked to the cutterhead 36. When the valve 158 is in its rest position, as shown in FIG. 6, and the solenoid of the valve 153 is energized by the electrical circuit, the oil flow from the feed line 150 to the gear motor 110, drives the latter to rotate the cutterhead 36 in a sense, opposite to the normal operating sense as indicated by arrow F. When the valve 153 is not actuated and the cutterhead 36 is rotated in its normal operation sense by the engine 70, the PTO gearbox 71 and the main belt transmission, the gear motor 110 is also driven by the same drive line. As the rotation of the gear motor 110 is reversed, it acts as a gear pump, providing an oil flow to the valve 158, which can be shifted up or down, in order to energize hydraulic actuators of auxiliary devices 162 of the forage harvester or of the attachment 10. For example, such an auxiliary device 162 may comprise a feed auger 164 of the attachment 10, which is rotated by a hydraulic motor 163. It may equally comprise a crop collecting container (not shown), which is lifted by a hydraulic cylinder (not shown) during discharge operation, or a pump for mixing additives, such as molasses or propionic acid, among the processed crop material.

The hydraulic line between the motor 110 and the valve 158 is protected by a pressure relief valve 165. When the valve 158 is in its rest position, the motor 110 draws in hydraulic oil from the return line 139 and feeds it back to the same. This oil mixes with the oil, which is constantly fed by the stack valve feed line 150. When the motor 110 suddenly requires an increased oil flow, which exceeds the flow from the valve 158 and the feed line 150, it will draw in supplementary oil in from the tank 134 through a free non-return valve 166. Such an increased oil demand may for example occur during the extension of a hydraulic cylinder.

Aforementioned electrical circuit also comprises a proximity sensor 168, shown in FIG. 3, which is installed below the sheave 99, whereof the rotational speed is proportional to the speed of the cutterhead 36. The signal from the sensor 168 is used to calculate the speed of the cutterhead 36, which value is monitored by the programmable control unit of the electrical circuit.

When the operator of the forage harvester gives a command to reverse the cutterhead 36 through the electrical circuit, the control unit will deenergize the solenoids of the control valve 129, which consequently returns to its rest position, shown in FIG. 6. The hydraulic clutch 124 is disengaged, but the main belt transmission remains engaged by the pressure of the hydraulic cylinder 106, maintaining the first drive line portion coupled to the second drive line portion, and hence the rotating cutterhead 36 to the other crop processing means, comprising the blower rotor 49 and the feedrolls 20, 21, 26, 27. The moment of inertia of the cutterhead 36 temporarily drives said other crop processing means, the reaction whereof assists in slowing down the rotating cutterhead 36. Meanwhile, the speed of the cutterhead 36 is monitored by the control unit, which inhibits the actuation of the reversing mechanism as long as said speed exceeds the threshold of 10 rotations per minute. When the cutterhead speed has fallen below said threshold, the control unit energizes a solenoid of valve 129 in order to shift the latter to the left, retract the cylinder 106 and disengage the main belt transmission. Thereafter, the control unit energizes the solenoid of the valve 153 for providing driving power to the reversing gear motor 110, which now rotates the cutterhead in the opposite sense. The overrun clutch 87, which otherwise drives the crop processor rolls 38, disengages and, as the main belt transmission between the cutterhead 36 on the one hand, and the blower rotor 49 and the feedrolls 20, 21, 26, 27 on the other hand, was already disengaged, the gear motor 110 only has to drive the cutterhead 36.

DESCRIPTION OF OTHER EMBODIMENTS

Figure 7:
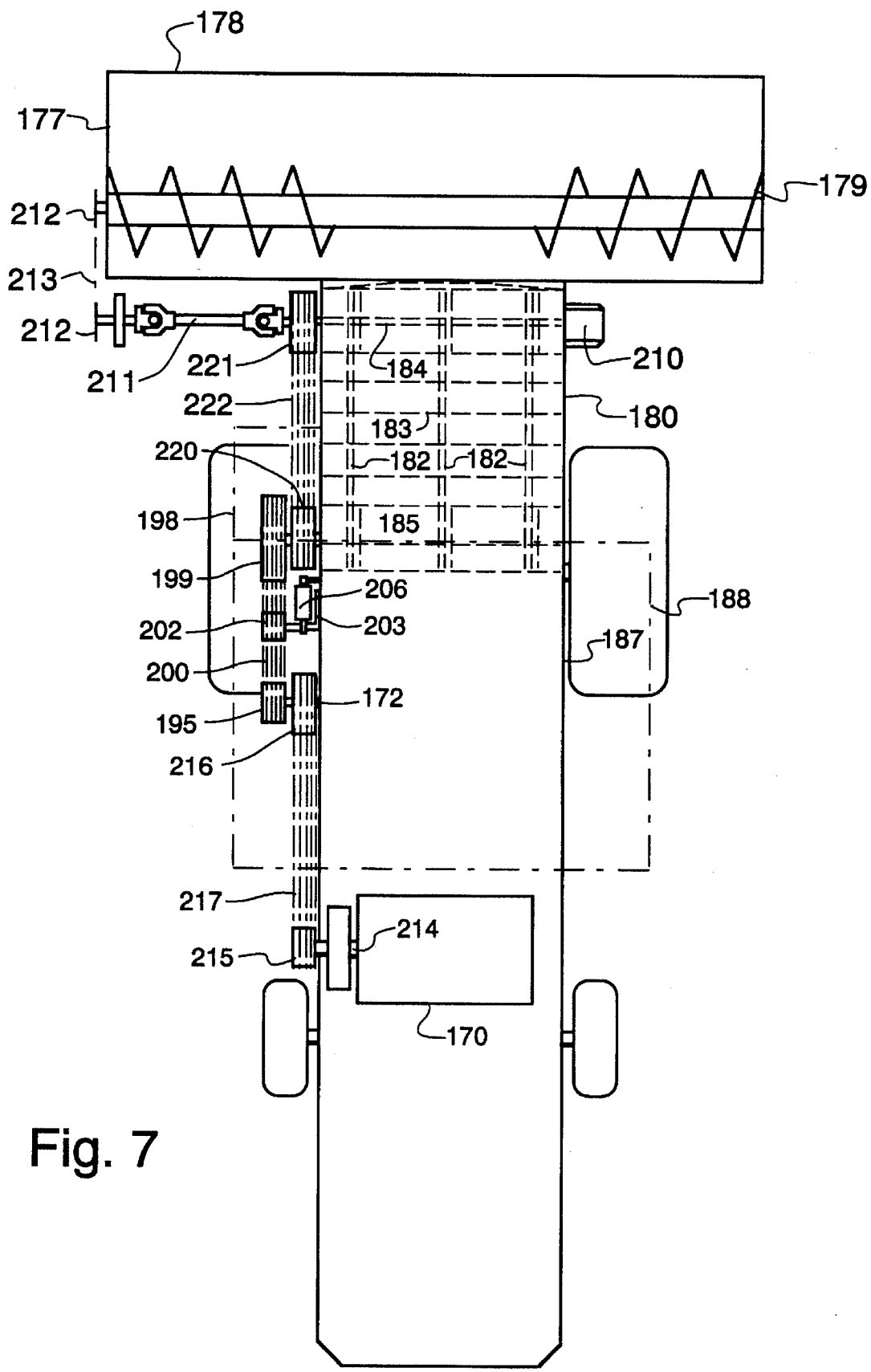
FIG. 7 is a schematic view of a portion of the drive lines and driven crop processing means of a combine harvester, according to the invention.

In FIG. 7, there is shown a combine harvester according to a second embodiment of the invention. The combine harvester is equipped with a header 177, having at its front end a cutterbar 178 and comprising a centring auger 179 for conveying the crop material cut by the cutterbar 178 to the entrance of an elevator housing 180. The crop material is engaged by an elevator chain assembly, including three elevator chains 182, running on sheaves on a front shaft 184 and a rear shaft 185, and a plurality of transversely positioned elevator slats 183, which convey said crop material to the entrance of the body 187 of the combine harvester. The body 187 encloses further crop processing means, such as a threshing drum cooperating with a stationary concave, straw walkers, a sieve shaker shoe and a ventilator for blowing chaff and other impurities from between the grain kernels out of the combine body 187. The cleaned grain is delivered to a grain tank 188 on top of the body 187.

The combine is driven by an engine 170, installed behind the grain tank 188. A PTO shaft 214, coupled to the flywheel of the engine 170, carries a sheave 215, which drives another sheave 216 through a transmission belt 217. The other sheave 216 is mounted on an intermediary shaft 172, carrying a further sheave 195. An elevator drive sheave 198 is mounted in alignment with the further sheave 195 on the rear elevator shaft 185. The two latter sheaves 195, 198 are encompassed by a transmission belt 200, which is tensioned during normal harvesting operation for engaging said sheaves 195, 198 and driving them in a first sense by means of an idler roll 202 mounted on a idler arm 203, which is pivoted upwardly by a hydraulic cylinder 206.

A second sheave 220 is mounted on the rear elevator shaft 185 in alignment with a sheave 221 on the front elevator shaft 184. These elevator sheaves 220, 221 are permanently interconnected by an elevator belt 222. The right end of the front elevator shaft 184 is connected to a hydraulic gear motor 210 and its left end to a drive shaft 211, which drives a sprocket wheel 212 of the header 177. Another sprocket 212 on the axle of the header auger 179 is drivingly linked thereto by a chain 213. The elevator sheaves 220, 221, the belt 222, the drive shaft 211, the sprocket 212 and the chain 213 constitute a first drive line portion, which is coupled to the engine 170 by tensioning the belt 202 with the idler roll 202.

The engine 170 also drives a hydraulic pump (not shown) for pressurizing the cylinder 206 and driving the gear motor 210. A second drive line (not shown), equally coupled to the engine 170, drives the further crop processing means, comprising the threshing drum, the straw walkers, the sieve shaker shoe and the ventilator.

When the header auger 179 or the elevator chain assembly get jammed by an excessive amount of incoming crop material, the operator can clear the header 177 or the elevator housing 180 by releasing the pressure from the cylinder 206 for disengagement of the belt transmission 195, 199, 200, and energizing the hydraulic motor 210, which drives the elevator chains 182 and the auger 179 through the first drive line portion in a second sense, opposite to first sense. As the second drive line portion is disconnected therefrom, no further crop processing means are driven and only a limited amount of energy has to provided by the gear motor 210.

During normal harvesting operation the gear motor 210 is continuously rotated in the first sense by the engine 170 and the first drive line portion. It acts as a hydraulic pump, whereof the oil flow can be used for providing driving power to hydraulic actuators of other crop processing means of the combine harvester. These actuators may include hydraulic cylinders or hydraulic motors.

Other embodiments of the reversing means for an agricultural harvesting machine can be thought of without departing from the original idea of the invention. For example, the hydraulic gear motor 110 of the forage harvester, may be directly linked to the cutterhead axle 39 or any other component of the first drive line portion. The belt transmission between the first and the second drive line portion may be replaced with a friction clutch or a second hydraulic clutch. It is also conceivable to use the gear motor 110 for the reversal of the feed rolls 20, 21, 26, 27. Reversing means according to the invention may advantageously be used in other self-propelled or pull-type harvesting machines, such as mower-conditioners or rectangular balers.

It will thus be appreciated that there is provided reversing means which requires no clutch means between the reversing motor and the reversed crop processing means. During normal harvesting operation the motor can be used as a supplementary power source for operating auxiliary devices.

While the preferred structure in which the principles of the present invention have been incorporated is shown and described above, it is to be understood that the invention is not to be limited to the particular details, as shown and described above, but that, in fact, widely different means may be employed in the practice of the broader aspects of the invention.

Having thus described the invention, what is claimed is:

1. An agricultural harvesting machine comprising:

a power plant (70) for, during normal harvesting operation, driving, via power transmission means (124, 72–75, 77, 80, 81, 83, 84, 95, 98–100, 111, 112, 39, 87–91), a plurality of crop processing means (20, 21, 26, 27, 36, 38, 49) in a first sense; and motor means (110), drivingly coupled to at least one of said crop processing means (36) and operable to drive said at least one crop processing means (36) in a second sense, opposite to the first sense under conditions where said power plant is not driving said at least one of said crop processing means (36) via said power transmission means;

characterized in that:

during normal harvesting operation said motor means (110) remain coupled to said at least one crop processing means (36) and said motor means (110) are driven via said power transmission means (124, 72, 95, 98–100) in the first sense relative to said at least one of said crop processing means (36).

2. An agricultural harvesting machine according to claim 1, wherein it is further characterized in that, during normal harvesting operation, said motor means (110) is operable to provide driving power to a further apparatus (162).

3. An agricultural harvesting machine according to claim 2, wherein it is further characterized in that, said motor means comprise a hydraulic motor (110), which acts as a hydraulic pump during normal harvesting operation.

4. An agricultural harvesting machine according to claim 1, wherein it is further characterized in that, said at least one crop processing means (36) is drivingly connected to further crop processing means (38) by means of an overrun clutch (87), which interrupts power transmission when said at least one crop processing means (36) is driven in the second sense by said motor means (110).

5. An agricultural harvesting machine according to claim 1, wherein it is further characterized in that, said power transmission means comprise, a first drive line portion (98, 111, 112, 39, 87–91), for driving a first set of crop processing means (36, 38), including the at least one crop processing means (36), to which the motor means (110) are drivingly coupled;

a second drive line portion (73–75, 77, 80, 81, 83, 84), for driving a second set of crop processing means (20, 21, 26, 27); and a clutch means (95, 99, 100, 102, 103, 106), for enabling coupling, respectively uncoupling of said first drive line portion (98, 111, 112, 39, 87–91) to, respectively from said second drive line portion (73–75, 77, 80, 81, 83, 84).

6. An agricultural harvesting machine according to claim 5, wherein it is further characterized in that, said clutch means comprise:

a belt transmission including a pair of sheaves (95, 99), at least one belt (100) and an idler roll (102) operable to tension said at least one belt (100) for bringing it into engagement with said sheaves (95, 99); and a hydraulic circuit including a hydraulic cylinder (106) coupled to said idler roll (102) and disposed to be pressurized through a first hydraulic valve (154).

7. An agricultural harvesting machine according to claim 6, wherein it is further characterized in that, said power transmission means (124, 72–75, 77, 80, 81, 83, 84, 95, 98–100, 111, 112, 39, 87–91) are connectable to said power plant (70) by means of a hydraulically operated main clutch (124), which itself is also coupled to said hydraulic circuit and controlled by said first valve (154), in such a manner that said belt transmission (95, 99, 100) is engaged when said main clutch (124) is engaged.

8. An agricultural harvesting machine according to claim 7, wherein it is further characterized in that, said first valve (154) is operable to pressurize said hydraulic cylinder (106) while said main clutch (124) is disengaged.

9. An agricultural harvesting machine according to claim 5, wherein it is further characterized in that, actuation of said motor means (110) is controlled by control means, said control means comprising a sensor (168) for sensing the speed of said at least one crop processing means (36), and said control means being operable to inhibit the energization of said motor means (110) for driving said at least one crop processing means (36) in the second sense, when said sensor (168) senses a speed above a predetermined threshold.

10. An agricultural harvesting machine according to claim 9, wherein it is further characterized in that, said control means also control said clutch means (95, 99, 100, 102, 103, 106), for keeping said first drive line portion (98, 111, 112, 39, 87–91) connected to said second drive line portion (73–75, 77, 80, 81, 83, 84), when said sensor (168) senses a speed above said predetermined threshold.

11. An agricultural harvesting machine according to claim 4, wherein it is further characterized in that, actuation of said motor means (110) is controlled by control means, said control means comprising a sensor (168) for sensing the speed of said at least one crop processing means (36), and said control means being operable to inhibit the energization of said motor means (110) for driving said at least one crop processing means (36) in the second sense, when said sensor (168) senses a speed above a predetermined threshold.

12. An agricultural harvesting machine according to claim 11, wherein it is further characterized in that, said control means also control said clutch means (95, 99, 100, 102, 103, 106), for keeping said first drive line portion (98, 111, 112, 39, 87–91) connected to said second drive line portion (73–75, 77, 80, 81, 83, 84), when said sensor (168) senses a speed above said predetermined threshold.

13. A method for reversing at least one crop processing means (36) of an agricultural harvesting machine according to claim 5, comprising the steps of:

disconnecting said power plant (70) from said power transmission means with a main clutch (124);

sensing the speed of said at least one crop processing means (36) and inhibiting the actuation of said motor means (110) for driving said at least one crop processing means (36) in the second sense, as long as said speed does not fall under a predetermined threshold;

energizing said motor means (110) for rotation in said second sense, when said speed has fallen under said predetermined threshold.

14. A method according to claim 13, characterized further in the steps of:

keeping said at least one crop processing means (36) drivingly coupled by a clutch means (95, 99, 100, 102, 103, 106) to a portion of said first and second drive line portions (73–75, 77, 80, 81, 83, 84), which drives further crop processing means (20, 21, 26, 27), as long as said speed does not fall under said predetermined threshold; and disconnecting said at least one crop processing means (36) from said portion of said drive line (73–75, 77, 80, 81, 83, 84) by declutching said clutch means (95, 99, 100, 102, 103, 106), prior to said motor means (110) driving said at least one crop processing means (36) in the second sense.

15. A method according to claim 13, characterized further in the step of:

inhibiting the transmittal of motive power in the second sense from said at least one crop processing means (36) to a further crop processing means (38) by means of an overrun clutch (87) provided in the drive line (39, 87–91) therebetween.

* * * * *